(No Model.)

F. R. GOODE.
TRAMMEL GEARING.

No. 534,874. Patented Feb. 26, 1895.

WITNESSES
G. Arthur Pennington
Wm. DuVal Brown

INVENTOR
Frank R. Goode
By L. S. Bacon
Attorney

UNITED STATES PATENT OFFICE.

FRANK R. GOODE, OF KINGFISHER, OKLAHOMA TERRITORY.

TRAMMEL-GEARING.

SPECIFICATION forming part of Letters Patent No. 534,874, dated February 26, 1895.

Application filed May 25, 1894. Serial No. 512,473. (No model.)

*To all whom it may concern:*

Be it known that I, FRANK R. GOODE, a citizen of the United States, residing at Kingfisher, in the county of Kingfisher and Territory of Oklahoma, have invented certain new and useful Improvements in Trammel-Gearing; and I do hereby declare the following to be a full, clear, and exact description of the invention, such as will enable others skilled in the art to which it appertains to make and use the same.

This invention relates to an improvement in trammel gearing and it consists in the construction and arrangement of parts hereinafter described and definitely pointed out in the claims.

The aim and purpose of the invention is the provision of an improved trammel gearing, adapted more especially for use in connection with wind wheels, and which will embody features admitting of a multiplicity of adjustments, ease in operation and rigidity of construction. These objects are attained by the construction illustrated in the accompanying drawings wherein like letters of reference indicate similar parts in the several views, and in which—

Figure 1:
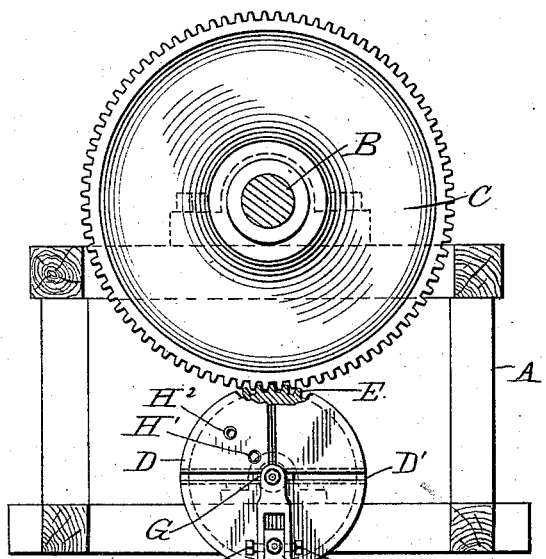
Figure 2:
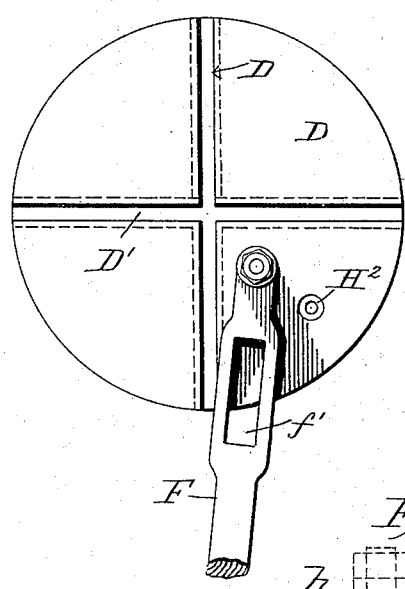
Figure 3:
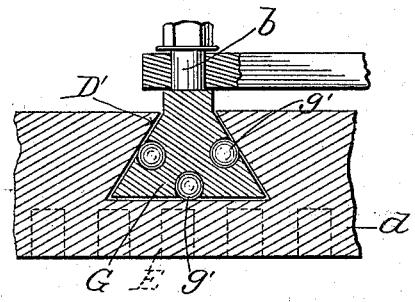
Figure 4:
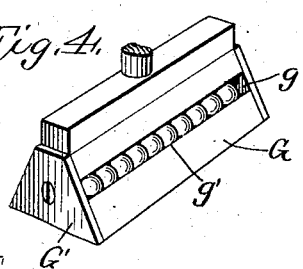
Figure 5:
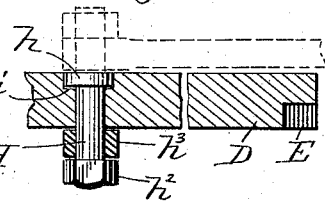

Figure 1 is an elevation of the improvement showing its association with a drive gear of a wind wheel shaft. Fig. 2 is a detail view of the trammel wheel showing the pitman removed from the slides and adjusted to a position beyond the trammel guides. Fig. 3 is an enlarged detail section through a portion of the trammel wheel and one of the slides. Fig. 4 is a detail perspective view of a slide; and Fig. 5 is a detail section through a portion of the wheel showing the reversible crank pin and indicating in dotted lines the reversed position.

In the drawings A represents a section of the frame of a wind wheel, B the wheel shaft, and C the gear wheel on the shaft B.

D represents my improved trammel wheel which is formed with the usual guide or runways D' crossing at the center. These guide ways are formed in the outer face of the wheel and enter the same to a point substantially midway the thickness of the wheel, thereby leaving a backing or rear section $d$ of sufficient thickness to permit of the formation of a circumferential series of gear teeth E which occupy one half only of the breadth of the periphery of the wheel and mesh with the teeth of the gear C. By this means the trammel has a rigid integral connection to which the power of the driving wheel is applied, the relative proximity of the teeth being an essential feature so that the power is directed directly to the periphery of the trammel, which adds greatly to the strength of the wheel and the durability or stability of its mounting.

The trammel is secured on a central shaft in the usual manner, which shaft is suitably journaled on the frame A directly below the wheel C.

F represents the pitman which carries the slides G fitting in the guide ways of the trammel wheel. These slides have flat faces and inclined sides at the center of each of which are formed circular longitudinal pockets $g$, having open sides, in which a series of balls $g'$ are placed. The balls project slightly through the openings in the pockets so as to engage the walls of the guide ways and are of a diameter greater than the width of the opening so that they will be retained in the pockets.

G' are end plates removably held on the blocks or slides by suitable screws, and thereby acting as closures for the ends of the pockets $g$.

The extreme upper end of the pitman F has a circular bearing through which the pivot pin $f$ of the upper slide passes, while below this bearing is formed an elongated slot $f'$.

F' is a journal block of a length less than that of the slot $f'$ in which it fits. This block F' is held in the slot by a rib or in any suitable manner, and is held firmly in position when adjusted, by the set screws $f^2$ which pass through the walls of the slot and impinge against the block. The pivot pin of the lower slide is journaled in the adjustable block F' so that the length of the stroke of the pitman may be varied by varying the relative distance between the two slides.

The trammel is made convertible by the following instrumentalities:

H represents a removable and reversible crank pin passing through an opening H' in the wheel D. This pin has a flange head $h$ normally fitting in a counter sink $h'$ in the trammel face of the wheel D so that its face will be flush with the face of the wheel and out of the path of the pitman when the latter is connected to the sides. Its opposite end is provided with a nut $h^2$ and an interposed sleeve $h^3$ which prevents the flanged head from protruding into the path of the pitman.

$H^2$ represents an opening arranged outwardly beyond the other opening $H'$ in the wheel and through which the pin H may be passed. This outer opening $H^2$ is adapted to receive the pin H when necessity requires.

In operation the wheel C which as shown is of greater diameter than the wheel D, will be rotated by the wind wheel, and transmits its motion to wheel D, which will be rotated proportionately or at the rate of three revolutions to one of the wheel C, and by forming the outer face of the wheel D into a trammel, the movement of the pitman is multiplied so that six movements or reciprocations of the pitman is had to one revolution of the wind wheel shaft. It is often desired to utilize the power of the wind wheel for numerous purposes such as pumping water, grinding and cutting feed, turning light machinery and the like, each of which uses requires usually different lengths of strokes of the pitman and different speeds. This variation I accomplish by the adjustments admitted by the construction above described. Should the wheel be used for pumping a small stream of water the pitman is removed from the slides and adjusted to the crank pin H which is first removed and adjusted as shown in dotted lines Fig. 5, that is to say turned end for end and passed through the aperture in the end of the pitman. When the crank pin is adjusted to the inner hole the pitman will be reciprocated with short strokes, once each time the wheel D turns. When the strokes are required to be longer, the pin is adjusted to the outer opening or hole $H^2$. When it is desired to secure the full or extreme stroke of the pitman and the increased number of reciprocations the slide $F'$ is forced down in the slot $f'$ and there locked by the set screws $f^2$, thereby securing the full stroke of the pitman and reciprocating the same six times to one rotation of the wind wheel shaft. The length of the stroke may be shortened by adjusting the slide $F'$ up, and a short quick reciprocation of the pitman acquired thereby.

The construction and employment of the invention as described will be of great advantage, both to dealers and users, as the wind wheel may be gaged or adjusted for all work for which it is capable of performing.

By the use of the ball bearings in the slides the constant application of lubricant is dispensed with.

It is evident that the invention may be applied to machinery other than wind wheels, and it is further evident that minor changes can be made without departing from the nature and principle of my invention.

Having thus described the invention, what I claim as new, and desire to secure by Letters Patent, is—

1. The combination with the actuating gear, of a trammel wheel having an integral series of gear teeth which occupy one half only of the breadth of the periphery of the wheel, and the crossed grooves in its opposite face, the slides in the grooves, the pitman and longitudinally adjustable bearing block carried by the pitman, and connections between the block and one of the slides and the other slide and end of the pitman, substantially as described.

2. The combination with a trammel wheel having crossed grooves in its face, of the slides, a pitman having an elongated slot therein, a bearing block adjustably secured in the slot, pivotal connection between the block and one slide and the end of the pitman and the other slide, and set screws passing through the pitman and adapted to engage the block, substantially as described.

3. The convertible trammel-wheel having an opening therein, a reversible crank-pin removably secured in the opening, a pitman adapted for connection to said wheel, and means for holding the pin out of the path of the pitman, substantially as described.

In testimony whereof I affix my signature in the presence of two witnesses.

FRANK R. GOODE.

Witnesses:
G. ARTHUR PENNINGTON,
L. S. BACON.